(12) United States Patent
Günther et al.

(10) Patent No.: US 11,025,109 B2
(45) Date of Patent: Jun. 1, 2021

(54) PERMANENT MAGNET ROTOR (71) Applicant: Bühler Motor GmbH, Nuremberg (DE)

(72) Inventors: Heinz Günther, Oberasbach (DE); Martin Gundermann, Nuremberg (DE); Mladen Zec, Nuremberg (DE); Jochen Bauer, Ergersheim (DE); Andreas Wall, Nuremberg (DE); Klaus Weiske, Schwaig (DE); Armin Suttner-Reimann, Schwabach (DE)

(73) Assignee: BÜHLER MOTOR GMBH, Nürnberg (DE)

( * ) Notice: Subject to any disclaimer, the term of this patent is extended or adjusted under 35 U.S.C. 154(b) by 0 days.

(21) Appl. No.: 16/243,518

(22) Filed: Jan. 9, 2019

(65) Prior Publication Data
US 2019/0214864 A1  Jul. 11, 2019

(30) Foreign Application Priority Data

Jan. 10, 2018 (DE) .................. 10 2018 200 275.4
Oct. 25, 2018 (DE) .................. 10 2018 218 251.5

(51) Int. Cl.
*H02K 1/27* (2006.01)
*H02K 15/03* (2006.01)

(52) U.S. Cl.
CPC .......... *H02K 1/276* (2013.01); *H02K 1/2773* (2013.01); *H02K 15/03* (2013.01)

(58) Field of Classification Search
CPC ...... H02K 1/276; H02K 1/2773; H02K 15/03; H02K 1/22; H02K 1/27; Y10T 29/49012

(Continued)

(56) References Cited

U.S. PATENT DOCUMENTS 5,786,650 A * 7/1998 Uchida ............... H02K 1/2773
                                              310/156.55
7,800,272 B2 * 9/2010 Nakayama ........... H02K 1/2766
                                              310/156.56

(Continued)

FOREIGN PATENT DOCUMENTS

DE  10 2007 029 719 A1   8/2008
DE  11 2013 002 622 T5   3/2015

(Continued)

OTHER PUBLICATIONS totalmateria.com (Year: 2011).*
Office Action dated Jun. 11, 2019, issued in counterpart DE Application No. 10 2018 218 251.5 (6 pages).

*Primary Examiner* — Ahmed Elnakib
(74) *Attorney, Agent, or Firm* — Westerman, Hattori, Daniels & Adrian, LLP (57) ABSTRACT

A permanent magnet rotor of an electric motor, includes a laminated core having magnet pockets, the laminated core being composed of two partial laminated cores. A plurality of permanent magnets are held in a force-fitting manner in magnet pockets of the laminated core, the magnets extending over both partial laminated cores. Sheet metal tongues, which maintain the force fit of the permanent magnets, are deflected in the first partial laminated core in a first axial direction and in the second partial laminated core in a second axial direction opposite to the first direction, wherein the partial laminated cores consist of stamped metal sheets and the permanent magnets are pressed into the magnet pockets in the stamping direction.

12 Claims, 7 Drawing Sheets

(58) Field of Classification Search
USPC .................................................. 310/156.53
See application file for complete search history.

(56) References Cited

U.S. PATENT DOCUMENTS

| | | | | |
|---|---|---|---|---|
| 2009/0079285 A1* | 3/2009 | Koumura | ............. | H02K 21/044 |
| | | | | 310/156.16 |
| 2009/0096308 A1* | 4/2009 | Staudenmann | ...... | H02K 1/2773 |
| | | | | 310/156.08 |
| 2013/0187486 A1* | 7/2013 | Lee | ......................... | H02K 5/02 |
| | | | | 310/43 |
| 2014/0000096 A1* | 1/2014 | Takemoto | ............... | H02K 15/03 |
| | | | | 29/598 |
| 2014/0285049 A1 | 9/2014 | Nimura et al. | | |
| 2015/0028710 A1* | 1/2015 | Oka | ..................... | H02K 1/2773 |
| | | | | 310/156.48 |

FOREIGN PATENT DOCUMENTS

| | | | |
|---|---|---|---|
| DE | 10 2017 217 282 B3 | | 3/2019 |
| JP | H05146103 | * | 11/1991 |
| JP | 2015154665 | * | 8/2015 |

* cited by examiner

PERMANENT MAGNET ROTOR

CROSS-REFERENCE TO RELATED APPLICATIONS

The present patent application claims priority from, German Application No. DE 10 2018 218 251.5, filed Oct. 25, 2018, and German Application No. DE 10 2018 200 275.4 filed Jan. 10, 2018, both of which are incorporated herein by reference in their entireties.

BACKGROUND OF THE INVENTION

(1) Field of the Invention

The invention relates to a permanent magnet rotor of an electric motor, where the rotor comprises a laminated core composed of two partial laminated cores, a plurality of permanent magnets held in a force-fitting manner in magnet pockets of the laminated core, the magnets extending over both partial laminated cores.

(2) Description of Related Art Including Information Disclosed Under 37 CFR 1.97 and 1.98

In a plurality of known permanent magnet rotors, permanent magnets have a radial or tangential direction of extension within magnet pockets. In the case of radially arranged permanent magnets, significantly higher magnetic efficiencies can be achieved, which is why they are being increasingly used.

From DE 10 2015 222 271 A1 a generic permanent magnet rotor is known in which the magnets are arranged tangentially. There are two or more partial rotor bodies present, which can also be designed as laminated cores and in which the permanent magnets extend over this plurality of partial rotor bodies. One of the two partial rotor bodies can also be rotated by an angle of 180° with respect to an axis of rotation perpendicular to the rotor axis. The known document does not contain any indications as to how the permanent magnets are held in the axial direction within the magnet pockets.

BRIEF SUMMARY OF THE INVENTION

The object of the invention is to provide a safe and stable attachment over the lifespan of the permanent magnets in the magnet pockets in a generic permanent magnet rotor, wherein a preferably easy assembly is possible.

Deflectable sheet metal tongues which maintain the force fit between the permanent magnets and the magnet pockets are deflected in a first axial direction in a first partial laminated core and in a second axial direction in a second partial laminated core, the first direction being opposite to the second direction. As a result of this measure, migration of the magnets due to temperature variations, which may cause directed micro-movements, is prevented because their directions of movement are opposite. The partial laminated cores consist of stamped metal sheets. In order to achieve a sliding press-in process, it is provided that the permanent magnets are pressed into the magnet pockets in the stamping direction.

According to a first embodiment of the invention, the laminations of the two partial laminated cores are of identical design. As a result, a second stamping tool is saved and economical production is possible.

A development of this embodiment provides that the sheet metal tongues project into recesses for magnet pockets and that the lamination has recesses for magnet pockets with sheet metal tongues and recesses for magnet pockets without sheet metal tongues. This results in possible variations without increasing the number of laminations.

In one variant, the metal sheets of the lamination in the partial laminated cores are rotated relatively to each other so that metal sheet tongues and free spaces alternate in the axial direction within a magnet pocket. The free spaces allow the sheet metal tongues to bend solely on account of their own elasticity when the magnets are pressed in.

In a second embodiment, the lamination of the partial laminated cores consists of at least two different laminations, wherein the sheet metal tongues are not present in all laminations and/or differently formed sheet metal tongues are present in different laminations. In this way, free spaces between the sheet metal tongues can also be produced. The press-in force can be adjusted in a targeted manner via the press-in path of the permanent magnets by different layering.

Since the sheet metal tongues are deflected by the permanent magnet, the outer sheet metal tongues can hardly latch with the permanent magnet. It is therefore provided that, when viewed from an axial end of the rotor laminated core, no metal sheet tongues are present in the first or in the first two or in the first three or in the first four or in the first five metal sheets. This measure also serves to facilitate assembly because the permanent magnet can first be inserted with play into the magnet pocket, before it is pressed radially outwardly.

It is advantageous if the sheet metal tongues extend radially outwardly and accordingly push the permanent magnets radially outwardly, which are supported radially on poles or on pole shoes of the partial laminated cores. This is particularly expedient in the case of radially arranged permanent magnets with tangential magnetization because no magnetic field lines of the main field extend in the region of the sheet metal tongues. Free spaces around the sheet metal tongues are required and allow the sheet metal tongues to deflect. These free spaces also form flux barriers which minimize stray flux effects and magnetic short circuits.

Radii r1 (FIG. 1) are always present in the region of the pole shoes and radii r2 (FIG. 4) at the edges of the permanent magnets in consequence of the production process. So that the permanent magnets can be joined precisely during assembly, it has been proposed that the radii r1 in the transition region between the pole shoes and the adjoining side surfaces of the magnet pockets be made significantly smaller than opposite edge radii r2 of the permanent magnets.

The sheet metal tongues can have the same width at the base as at their radially outer tongue end. The bending forces on the sheet metal tongues are usually greatest at the base on a central ring. In order for the bending forces to be as independent as possible from the radial contact position with a permanent magnet, the sheet metal tongues should be tapered toward their free end. This results in a homogeneous force progression over the length of the sheet metal tongues. This can be arbitrarily adjusted by the degree of tapering.

The width of the magnet pockets can be significantly greater in the radial direction than in the tangential direction or vice versa.

A second solution is given by the following method steps: (a) providing two partial laminated cores and a plurality of permanent magnets; (b) axially pressing the permanent magnets into the first partial laminated core so that a first section of permanent magnets is held in magnet pockets of the first partial laminated core and a second section of the permanent magnets projects axially freely from the magnet pockets; (c) axially pressing the second partial laminated core onto the free ends of the permanent magnets. As a result of this approach, the sheet metal tongues are deflected in opposite directions so that there is no migration of the magnets as a result of temperature change loading.

During assembly, the permanent magnets can be magnetized in advance or, in one variant, can also only be magnetized in one partial laminated core, if only every second magnet pocket is equipped with a permanent magnet.

BRIEF DESCRIPTION OF THE SEVERAL VIEWS OF THE DRAWINGS

The exemplary embodiments of the invention are explained in more detail below based on the drawing. The following is shown.

Note: The reference symbols with index and the corresponding reference symbols without index refer to details with the same name in the drawings and the drawing description. This reflects use in another embodiment or the prior art and/or where the detail is a variant.

DETAILED DESCRIPTION OF THE INVENTION

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

Figure 1:
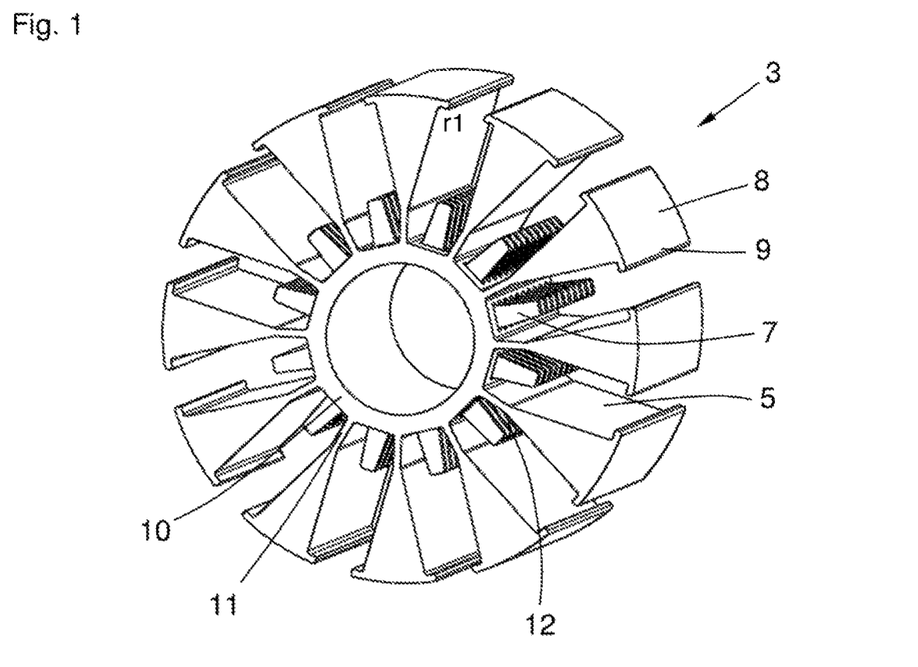
FIG. 1 is a perspective view of a partial laminated core.

FIG. 1 shows a partial laminated core 3 consisting of a plurality of differently formed metal sheets. A first lamination has poles 8 extending radially and connected via webs 11 to a central ring 10, the poles being separated from each other by recesses forming magnet pockets 5. In a second lamination, metal sheet tongues 7 extending radially from the central ring are additionally present in each magnet pocket 5. The two laminations alternate so that a free space 12 remains between two axially adjacent sheet metal tongues 7. The poles 8 have tangentially adjoining pole shoes 9 that serve as a radial stop for permanent magnets to be mounted in the magnet pockets 5.

Figure 2:
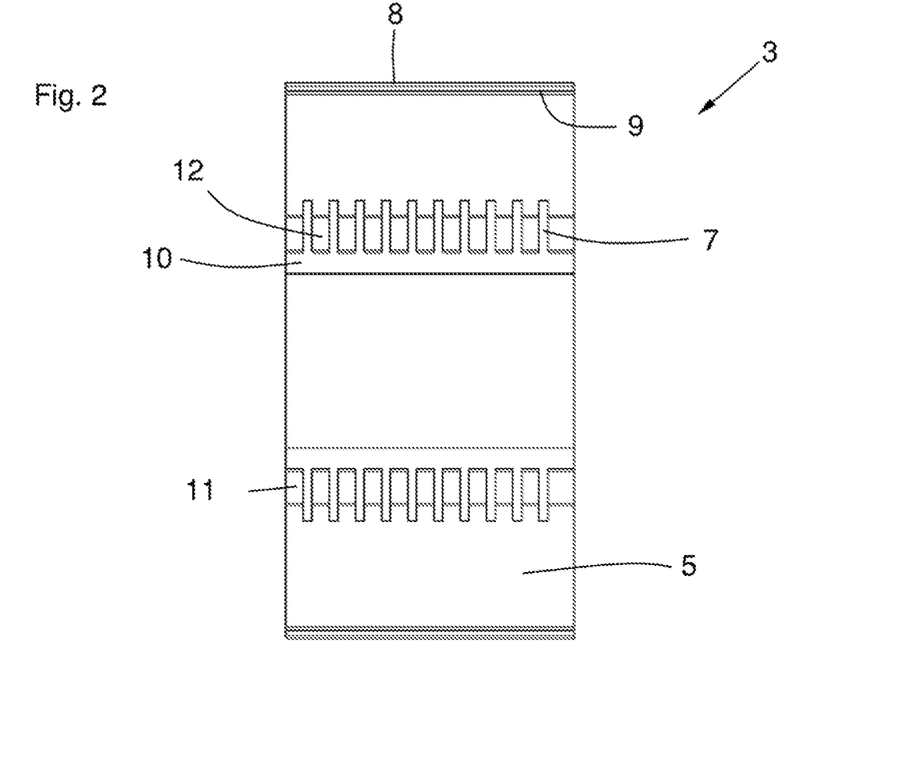
FIG. 2 is a sectional view through the partial laminated core according to FIG. 1.

FIG. 2 shows a simplified sectional view (without resolution of the sheet metal layers) of the partial laminated core 3 from FIG. 1, wherein the free spaces 12 between the sheet metal tongues 7 can be seen more clearly. Also shown are the poles 8, the pole shoes 9, the central ring 10, and the webs 11.

Figure 3:
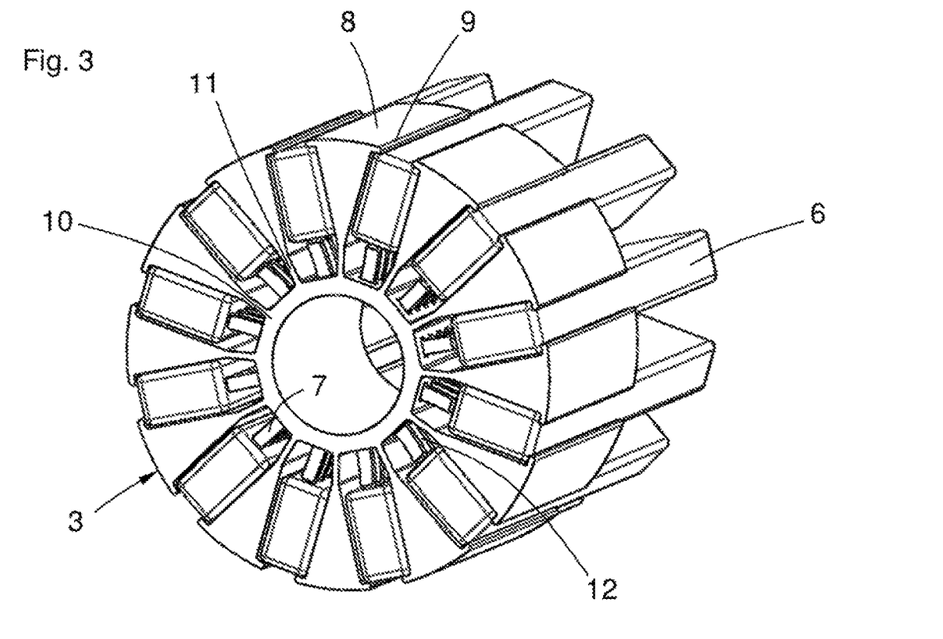
FIG. 3 is a perspective view of a partial laminated core equipped with permanent magnets.

FIG. 3 shows a perspective view of a partial laminated core 3 equipped with permanent magnets 6, with the poles 8, the pole shoes 9, the sheet metal tongues 7, the central ring 10, the webs 11, and the free spaces 12. Since the permanent magnets extend over two partial laminated cores 3, they project with half their length axially beyond the first partial laminated core 3 in this view.

Figure 4:
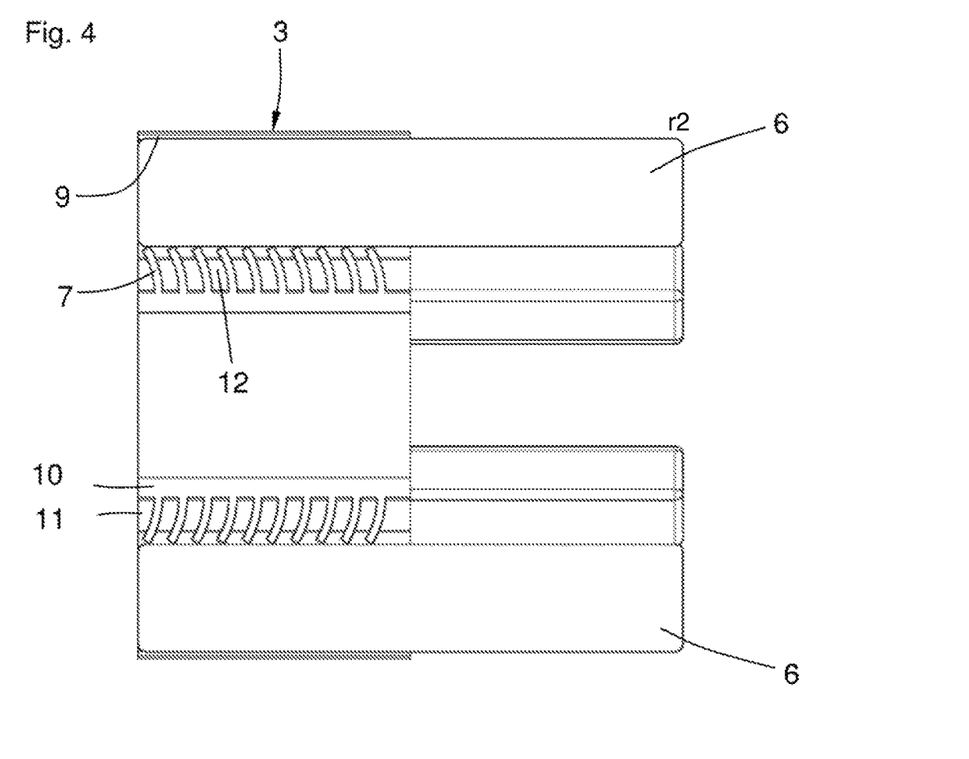
FIG. 4 is a sectional view of the equipped partial laminated core according to FIG. 3.

FIG. 4 shows a simplified sectional view (without resolution of the sheet metal layers) of the partial laminated core 3 according to FIG. 3 equipped with permanent magnets 6, with the central ring 10, the sheet metal tongues 7, the webs 11, the free spaces 12, the poles 8, and the pole shoes 9. The permanent magnets 6 are radially clamped free of play between the sheet metal tongues 7 and the pole shoes. The sheet metal tongues 7 are bent in the press-in direction of the permanent magnets 6. The sheet metal tongues can be elastic or elastically and plastically deformed.

Figure 5:
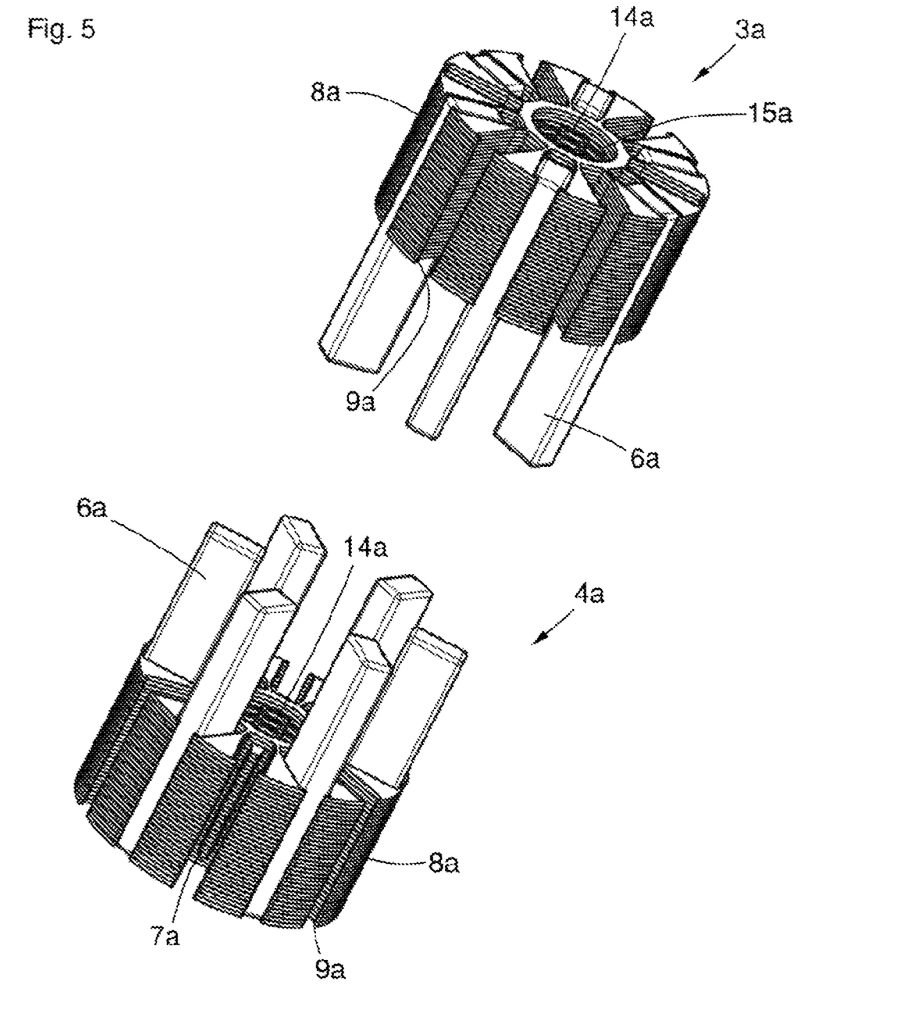
FIG. 5 is a perspective view of two partial laminated cores with partially equipped magnet pockets.

FIG. 5 shows a perspective view of two partial laminated cores 3a, 4a partially equipped with permanent magnets 6a. In the intermediate state shown, only every second magnetic pocket 5a carries a permanent magnet 6a. The two partial laminated cores 3a, 4a are identical and rotated by 180° relatively to each other about an axis which is perpendicular to the rotor axis. In addition, the two partial laminated cores 3a, 4a are pivoted about the rotor axis by a rotor pole pitch. The sheet metal tongues 7a can be seen in those magnet pockets 5a not equipped with permanent magnets. In a central recess 15a, protrusions 14a are provided, which serve for clamping a shaft to be received. These protrusions also have recesses and act similarly to the spring tongues 7a. No protrusions 14a are provided at the beginning of the laminated core in order to facilitate insertion of the shaft. When pressing the permanent magnets in, they must be given good guidance. The partially equipped partial laminated cores are particularly suitable for smaller design sizes because more space remains between the permanent magnets for the assembling devices. The poles 8a, the pole shoes 9a are also shown in FIG. 5.

Figure 6:
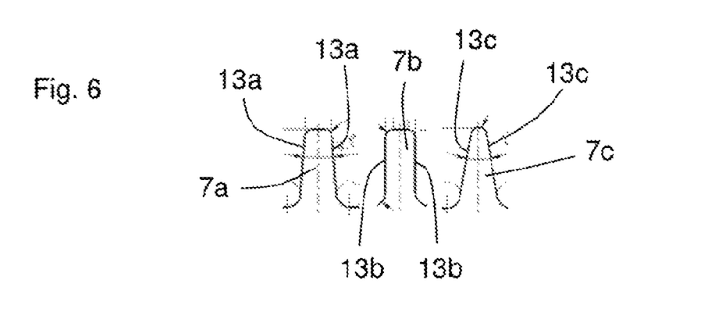
FIG. 6 is a plan of different sheet metal tongues.

FIG. 6 shows a plan view of different sheet metal tongues 7a, 7b, and 7c. The sheet metal tongues 7a, 7b, and 7c have side edges 13a, 13b, 13c and are rounded at the corners at their free ends. The side edges 13b extend parallelly in the sheet metal tongue 7b. In the case of the sheet metal tongues 7a and 7c, the side edges 13a, 13c converge toward each other, with a smaller angle in the sheet metal tongue 7a and a larger angle in the sheet metal tongue 7c. The larger the angle between the side edges, the lower the spring constant of the sheet metal tongue. In the case of the sheet metal tongue 7b with the parallel side edges 13b, high pressing forces are rapidly achieved with a short spring travel during bending. With the sheet metal tongues 7c with the large angle, softer spring properties are achieved. A larger tolerance range can thereby be covered. With the sheet metal tongues 7a, which have a smaller angle of their side edges 13a, similar forces act as generated in the sheet metal tongues 7c, but greater lateral forces caused by the spring action are prevented from being generated. It is also possible to vary the width of the sheet metal tongues in the region of the central ring in order to influence the spring force.

Figure 7:
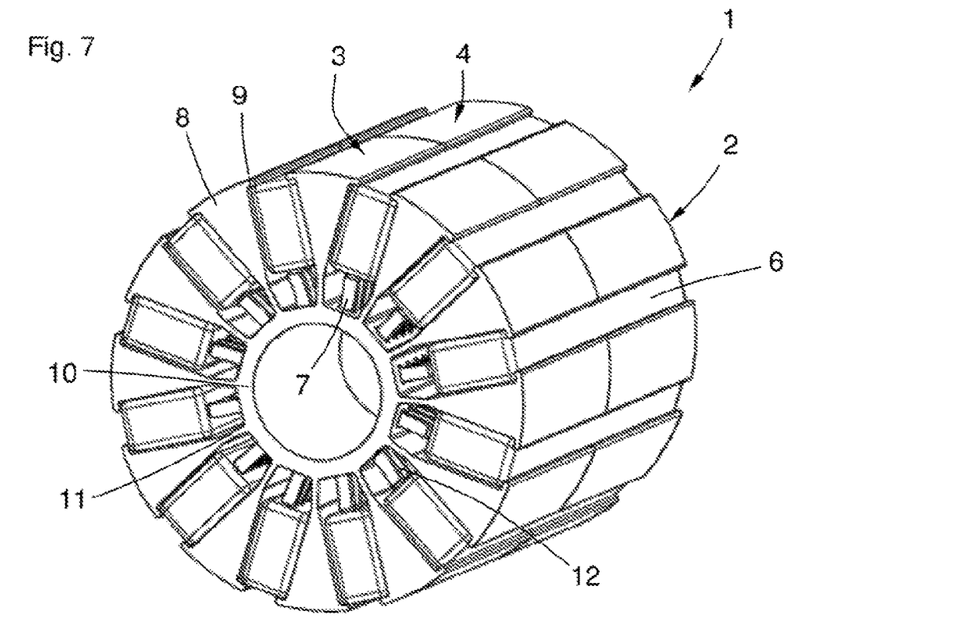
FIG. 7 is a perspective view of a spatial representation of a mounted permanent magnet rotor.

FIG. 7 shows a spatial representation of a mounted permanent magnet rotor 1 having a laminated core 2, the first partial laminated core 3, the second partial laminated core 4, the permanent magnets 6, the sheet metal tongues 7, the central ring 10, the poles 8, the pole shoes 9, the webs 11, and the free spaces 12. The permanent magnets 6 extend over both partial laminated cores 3 and 4.

Figure 8:
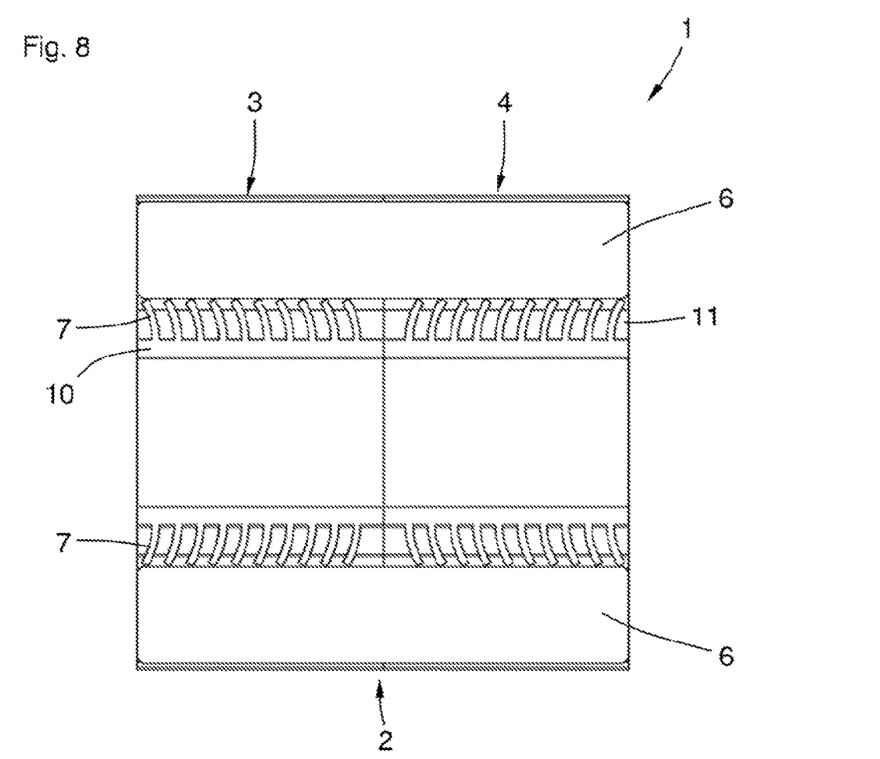
FIG. 8 is a sectional view of the permanent magnet rotor according to FIG. 7.

FIG. 8 shows a simplified sectional view (without resolution of the sheet metal layers) of the permanent magnet rotor according to FIG. 7 with the partial laminated cores 3 and 4, the sheet metal tongues 7, the permanent magnets 6, the central ring 10, the webs 11, the free spaces 12, the poles 8, and the pole shoes 9. As can be clearly seen, the sheet metal tongues 7 in the partial laminated core 3 are deflected in the opposite direction to the sheet metal tongues in the partial laminated core 4.

Figure 9:
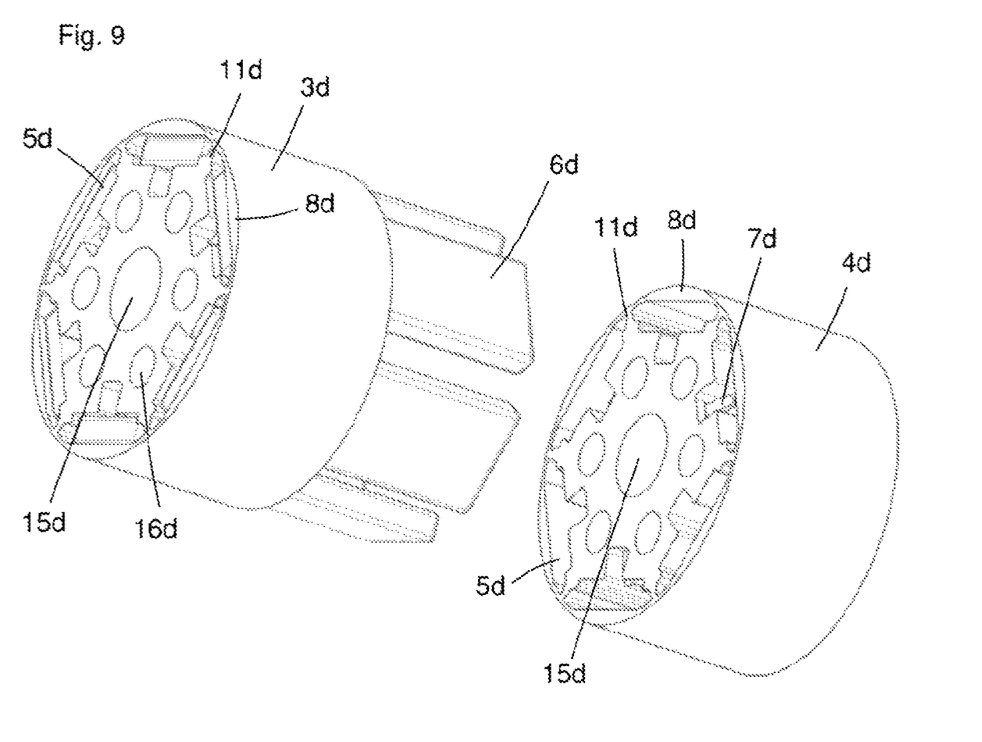
FIG. 9 is a perspective view of a second embodiment of a fully equipped partial laminate core with an unequipped partial laminated core.

FIG. 9 shows a perspective view of a second embodiment of a fully equipped partial laminated core 3d with an unequipped partial laminated core 4d with tangentially arranged permanent magnets 6d, which are held in magnet pockets 5d of the first partial laminated core 3d.

Figure 10:
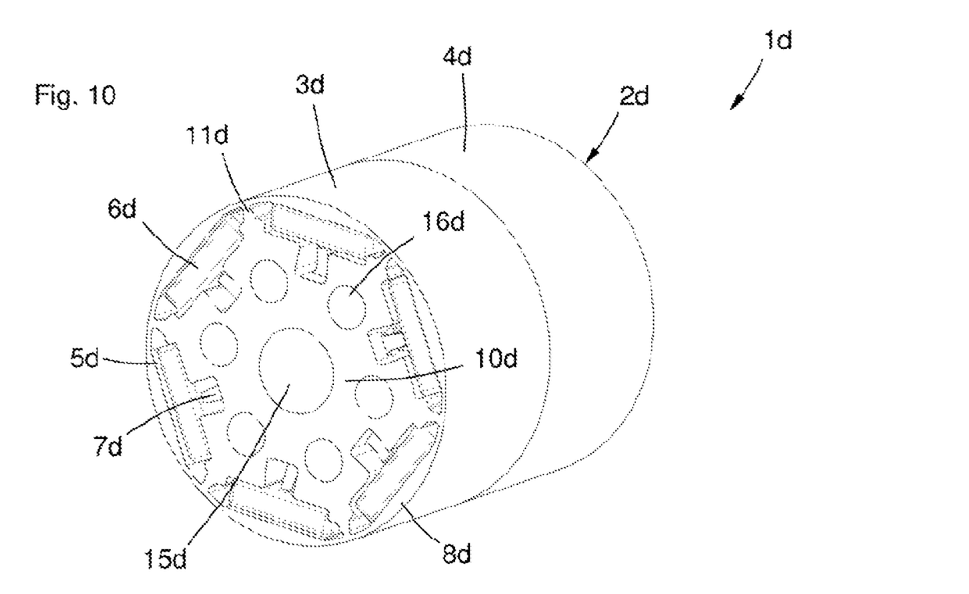
FIG. 10 is a perspective view of a spatial representation of an installed permanent magnet motor according to the second embodiment in FIG. 9.

FIG. 10 shows a spatial representation of a mounted permanent magnet motor 1d according to the second embodiment, with the first partial laminated core 3d, the second partial laminated core 4d, which together form the laminated core 2d, the magnetic pockets 5d, the mounted permanent magnets 6d, the sheet metal tongues 7d, the central recess 15d, the central ring 10d, the webs 11d between the central ring 10d and poles 8d, and the openings 16d.

Figure 11:
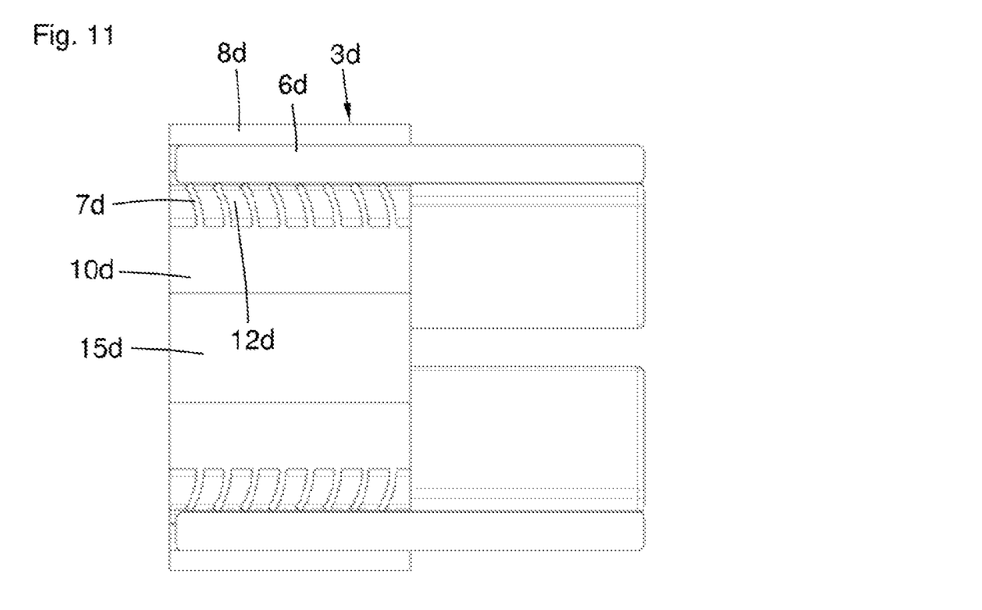
FIG. 11 is a sectional view of a fully equipped partial laminated core according to the second embodiment.

FIG. 11 shows a sectional view of a fully equipped partial laminated core 3d according to the second embodiment, with the poles 8d, the permanent magnets 6d, the central ring 10d, the sheet metal tongues 7d separated by free spaces 12d, and the central recess 15d.

Figure 12:
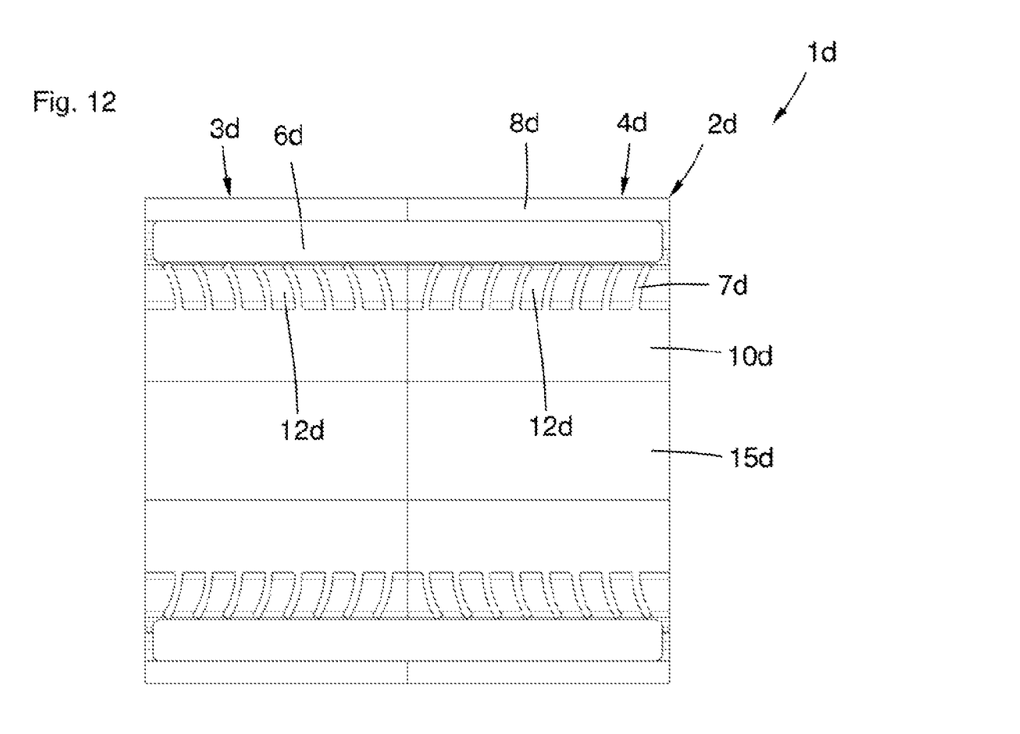
FIG. 12 is a sectional view of the permanent magnet rotor according to FIG. 10.

FIG. 12 shows a sectional view of the permanent magnet rotor 1d according to FIG. 10, with the partial laminated cores 3d and 4d, the poles 8d, the permanent magnets 6d, the metal sheet tongues 7d, the free spaces 12d, the central ring 10d, and the central recess 15d. As can be clearly seen, the sheet metal tongues 7d in the partial laminated core 3d are deflected in the opposite direction to the sheet metal tongues 7d in the partial laminated core 4d.

Figure 13:
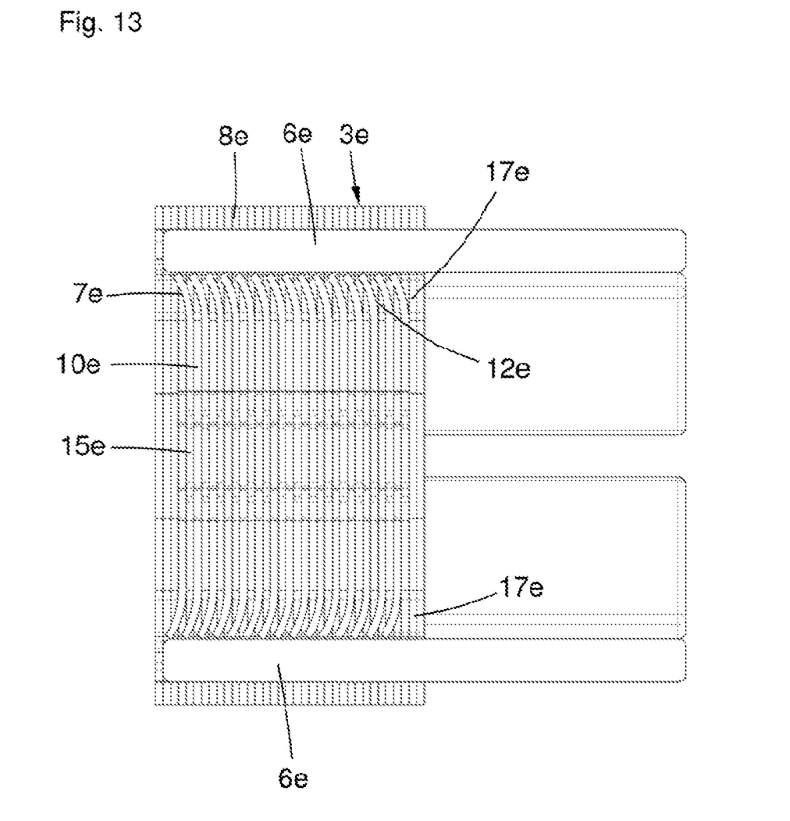
FIG. 13 is a sectional view of a variant of the second embodiment.

FIG. 13 shows a variant of the second embodiment, with the first partial laminated core 3e, the permanent magnets 6e, the poles 8e, the sheet metal tongues 7e, the free spaces 12e, the central ring 10e, the central recess 15e, and joining aids 17e in the form of a plurality of starting metal sheets which have no sheet metal tongues. This facilitates the mounting of the permanent magnets 6e.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

LIST OF REFERENCE SYMBOLS

1 Permanent magnet rotor
2 Laminated core
3 First partial laminated core
4 Second partial laminated core
5 Magnet pocket
6 Permanent magnet
7 Sheet metal tongue
8 Pole
9 Pole shoe
10 Central ring
11 Web
12 Free space
13 Side edge
14 Protrusion
15 Central recess
16 Opening
17 Joining aid

What is claimed is:

1. A permanent magnet rotor of an electric motor, the permanent magnet rotor comprising:
 a laminated core having magnet pockets, the laminated core being composed of two partial laminated cores;
 each partial laminated core including a central ring, poles extending radially and connected via webs to the central ring, each pole having pole shoes tangentially adjoining the pole, the pole shoes serving as a radial stop, and the magnet pockets consisting of an open recess defined by the central ring, the radially extending poles and the pole shoes;
 a plurality of permanent magnets held in a force-fitting manner in the magnet pockets of the laminated core, each of the magnets extending over both partial laminated cores; and
 a plurality of stamped metal sheets stacked to define the two partial laminated cores; spaced deflectable metal tongues radially extending from the central core and defined in a select number of the metal sheet sheets substantially within the boundary of the open recess, the deflectable metal tongues maintaining the force fit so that the permanent magnets are radially clamped free of play between the sheet metal tongues and the pole shoes, and being deflected in the first partial laminated core in a first axial direction and in the second partial laminated core in a second axial direction opposite to the first direction, select metal sheets having free spaces defined about the periphery of the select metal sheet between select deflectable metal tongues and the permanent magnets are pressed into the magnet pockets, the free spaces allowing the sheet metal tongues to bend when the magnets are pressed in in the stamping direction.

2. The permanent magnet rotor according to claim 1, wherein the laminations of the two partial laminated cores are identical.

3. The permanent magnet rotor according to claim 2, wherein stamped metal sheets of the first and second partial laminated cores further comprise second metal sheets without metal tongues thus defining free spaces on the metal tongues.

4. The permanent magnet rotor according to claim 1, wherein the lamination of the partial laminated cores consists of at least two different laminations, wherein the metal tongues are not present in all laminations and/or differently formed sheet metal tongues are present in different laminations.

5. The permanent magnet rotor according to claim 4, wherein one or more first laminations and one or more second laminations alternate in a partial laminated core.

6. The permanent magnet rotor according to claim 1, wherein, when viewed from an axial end of the rotor laminated core, no metal tongues are present in the at least one of the first plurality of metal sheets.

7. The permanent magnet rotor according to claim 1, wherein a radii in the transition region between the pole shoes and adjoining side surfaces of the magnet pockets are smaller than an opposite edge radii of the permanent magnets.

8. The permanent magnet rotor according to claim 1, wherein the metal tongues have a radially inner base and a radially outer tongue end, and one or more of the sheet metal tongues have the same width at their radially inner base as at their radially outer tongue end.

9. The permanent magnet rotor according to claim 1, wherein the metal tongues have a radially inner base and a radially outer tongue end, and one or more metal tongues are wider at their radially inner base than at their radially outer tongue end.

10. The permanent magnet rotor according to claim 1, wherein the metal tongues have a radially inner base and a radially outer tongue end, and one or more metal sheet tongues are wider at their radially inner base than at their radially outer tongue end.

11. The permanent magnet rotor according to claim 1, wherein the width of the magnet pockets is larger in the radial direction than in the tangential direction.

12. The permanent magnet rotor according to claim 1, wherein the width of the magnet pockets is larger in the tangential direction than in the radial direction.

\* \* \* \* \*